United States Patent
Beery

[15] 3,691,397
[45] Sept. 12, 1972

[54] CONTROL SYSTEM FOR BATTERY REGULATED POWER SUPPLY

[72] Inventor: Jack Beery, Farmington, Mich.

[73] Assignee: Burroughs Corporation, Detroit, Mich.

[22] Filed: Feb. 10, 1971

[21] Appl. No.: 114,206

[52] U.S. Cl.....................................307/66, 320/36
[51] Int. Cl..................................................H01j 7/00
[58] Field of Search........320/13, 36; 307/64, 65, 66, 307/52, 53, 54, 55, 56, 57, 58

[56]  References Cited

UNITED STATES PATENTS

| 3,308,306 | 3/1967 | Bagno | 307/66 |
| 3,113,255 | 12/1963 | Eberts | 320/36 |
| 2,573,483 | 10/1951 | Peters | 320/36 |

Primary Examiner—Herman J. Hohauser
Attorney—Kenneth L. Miller and Edwin W. Uren

[57] ABSTRACT

A control system utilizing a magnetic reed switch responsive to the output of a battery regulated power supply for controlling an impedance means to maintain the voltage output of the supply within a predetermined range. In the preferred embodiment, the power supply transformer has a separate secondary winding for controlling the energization of a relay coil to initially activate the reed switch. When the a.c. power is removed, particularly under adverse conditions, the battery maintains the output supply voltage within a predetermined voltage range until the relay coil senses a predetermined minimum voltage and in response thereto opens the reed switch effectively changing the impedance value of the impedance means from a finite value to an infinite value.

4 Claims, 2 Drawing Figures

PATENTED SEP 12 1972　3,691,397
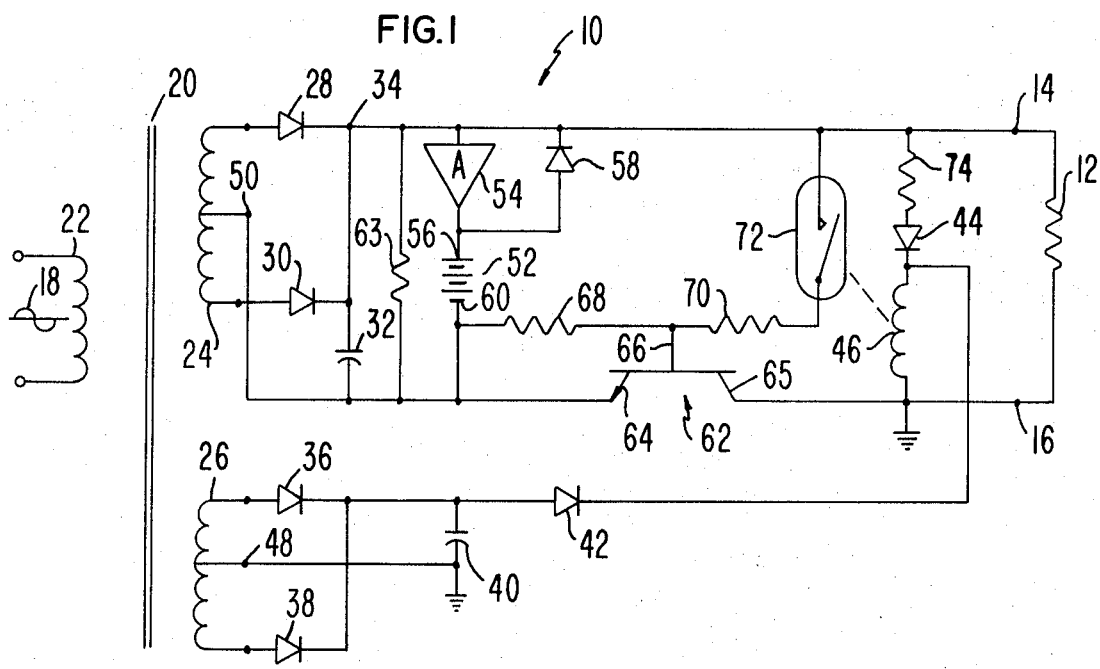
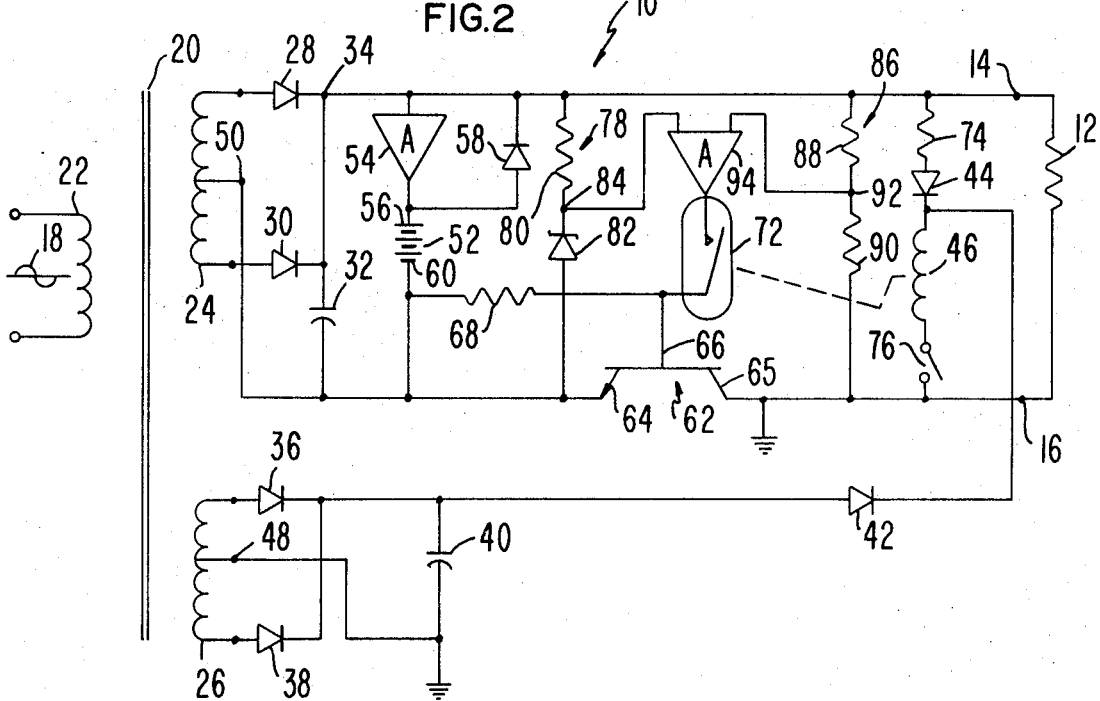
INVENTOR.
JACK BEERY
BY Russel C. Wells
ATTORNEY

CONTROL SYSTEM FOR BATTERY REGULATED POWER SUPPLY

BACKGROUND OF INVENTION

1. Field of Invention

This invention relates to a control system for maintaining the output of regulated power supply and in particular relates to a voltage regulating system providing over and under voltage protection and main power-on control in a battery regulated power supply by controlling a single element within the supply.

2. Description of Prior Art

Prior regulated power supplies typically provide for over and under voltage regulation of a power supply wherein each form of regulation is maintained by separate and individual control sections or units within the supply. Additionally, many regulated d.c. supplies provide means for inserting a battery in series with the load only in response to a loss in the a.c. energization voltage. Also, main power-on control is provided by a separate control means.

It is the principal object of this invention to provide both under and over voltage regulation through operation of the single control element within the power supply.

It is another object of this invention to control the main power-on and off control with the same element controlling the over-under voltage regulation.

It is still another object of this invention to prevent excessive current drain from a battery regulated power supply when there is loss of the a.c. power thereby increasing the useful life of the batteries.

SUMMARY OF INVENTION

A control system for maintaining and regulating the output supply voltage of a battery regulated power supply within a predetermined range. The supply is operatively coupled to a source of alternating current through a primary winding of a transformer. One secondary winding of the transformer is connected through a rectifying means to a relay coil and is responsive to the application of the source of alternating current. Another secondary winding is connected through a second rectifying means for supplying a d.c. voltage to an electrical load. A battery is electrically connected in shunt with the second rectifying means for maintaining the output thereof above a predetermined minimum value when the transformer is energized and for supplying power to the load when the transformer is de-energized. Electrically connected in shunt with the battery is a first voltage sensing means for generating a first control voltage proportional to the nominal regulated voltage of the supply. Additionally, the first voltage sensing means provides a light discharge path for the battery to avoid the memory-effect of the battery. Electrically connected in parallel with the load is a second voltage sensing means for generating a second control voltage proportional to the voltage applied to the electrical load. Both the first and second control voltages are compared in a voltage comparison unit and in response thereto, generates a control current proportional to the value of the second control voltage in relation to the first control voltage. The control current is applied through a switch that is responsive to the relay coil, to an impedance means or grounded collector transistor for maintaining the output supply voltage within a predetermined range. The transistor operates as a class A amplifier for varying its impedance according to the magnitude of the control current. The relay coil is initially energized by the application of a.c. supply to the transformer and will remain energized in the absence of a.c. as long as the output supply voltage of the power supply is greater than a predetermined minimum voltage. When the relay is de-energized the switch in the base of the transistor is opened thereby disconnecting the load from the battery. Additional means is provided for operating the transistor as the main power on-off switch.

DESCRIPTION OF DRAWINGS

In the Drawings:

FIG. 1 is a schematic of a battery regulated power supply having under voltage protection; and FIG. 2 is a schematic of a battery regulated power supply having over and under voltage regulation and under voltage protection.

DETAILED DESCRIPTION

Referring to the FIGS. by the characters of reference, there is illustrated in FIG. 1 a battery regulated power supply 10 supplying d.c. voltage to an electrical load 12 connected between a pair of output terminals 14 and 16. The supply is electrically connected to an alternating current source 18 by an isolation transformer 20. The output of the transformer is rectified for providing direct current voltage to the electrical load 12. A control system is utilized for initiating and maintaining the voltage supply at the terminals 14 and 16 within a predetermined voltage range.

The isolation transformer 20, as illustrated in FIG. 1, has a single primary winding 22 and a first secondary winding 24 and second secondary winding 26. In the preferred embodiment, the first secondary winding 24 is a center tap winding capable of providing the amount of direct current power required at the output terminals 14 and 16. The second secondary winding 26 is also a center tap winding and is used to supply a smaller amount of power for the voltage control system of the power supply.

The output voltage of each secondary winding is applied to a rectifier means to produce pulsating direct current voltage. Electrically connected to the first secondary winding 24 are a pair of rectifiers 28 and 30 which cooperate with the capacitor 32 to provide the pulsating direct current voltage at the output terminal point 34. In the second secondary winding 26, an additional pair of rectifiers 36 and 38 cooperate with a capacitor 40 to provide pulsating direct current voltage at the anode of the isolation diode 42. The cathode of the isolation diode 42 is electrically connected to the interconnection between the cathode of the blocking diode 44 and one end of a relay coil 46. The center tap connection 48 of the second secondary winding 26 is electrically connected to ground potential as is the other end of the relay coil 46; therefore, when the isolation transformer 20 is energized, the voltage output of the second secondary winding is applied to energize the relay coil 46.

Electrically connected in shunt across the rectifier means of the first secondary winding 24 and in particular between the terminal 34 and the center tap terminal 50 of the winding 24 is a battery circuit including a battery 52 and its associated charge control circuit as represented by the amplifier 54. An example of a battery charge control circuit is that claimed in U.S. Pat. No. 3,555,395 issued to the same assignee and is this application as incorporated herein by reference. The positive plate 56 of the battery is electrically connected through a blocking diode 58 to the terminal 14 of the power supply. The negative plate 60 of the battery is electrically connected through the impedance means 62 to ground potential. The negative plate 60 is also electrically connected to the center tap terminal 50 of the secondary winding 24. Additionally, a high valued resistor 63 is electrically connected in shunt across the battery for providing a low current discharge path for the battery to eliminate the memory-effect of the battery. The value of this resistor 63 is substantially greater than 100 times the value of the electrical load 12.

In the preferred embodiment, the impedance means 62 is a transistor electrically connected in a grounded collector configuration wherein the emitter lead 64 is electrically connected to the negative plate 60 of the battery and the collector lead 65 is grounded. The base 66 is electrically connected through resistor 68 to the negative side 60 of the battery 52 and also in circuit with the resistor 70 and normally open relay switch 72 to the output terminal 14 of the power supply. As previously indicated, the relay coil 46 which controls the switch 72, is electrically connected in one circuit to the second secondary winding 26 and is electrically connected in a second circuit through a current limiting resistor 74 and blocking diode 44 to the output terminal 14 of the power supply.

The function of the circuit comprising the current limiting resistors 74, blocking diode 44, relay coil 46 is to provide under-voltage protection of the power supply. The current limiting resistor 74 is of such size that the amount of current through the resistor is insufficient to energize the coil 46, however, once the coil is energized the amount of current through the resistor is sufficient to maintain the energization of the coil. As previously indicated, the coil is initially energized through the second secondary winding 26, therefore, when the alternating current source 18 is applied to the primary winding 22 of the transformer 20, the voltage developed by the second secondary winding 26 energizes the relay coil 46. When this coil is energized, the contacts of the switch 72 are closed providing a current path through the switch 72 and the two resistors 68 and 70 back to the center tap of the transformer. As the current builds up in the base 66 of the transistor 62, the transistor begins to conduct closing the circuit comprising the secondary winding 24 and the load resistor 12. The blocking diode 44 prevents voltage feed back from the second secondary winding 26 through the load resistor 12 and in a similar manner the blocking diode or isolation diode 42 prevents feed back of the voltage from the first secondary winding 24 into the second secondary winding 26.

When the source of alternating current power 18 is removed from the transformer 20 the load 12 will continue to receive power from the battery 52 as long as the voltage supplied to the load is above a predetermined value. As the battery becomes discharged due to the drain of the load current when the source of alternating current is removed, the voltage at the output terminal 14 with respect to the output terminal 16, decreases. As this voltage decreases the current through the resistor 74 also decreases until at some value the amount of current through the coil 46 is insufficient to maintain the coil energized.

In a similar manner, as the voltage at the output terminal 14 decreases with respect to the output terminal 16, the current in the base lead of the transistor 62 also decreases. As this current decreases, the voltage drop across the collector emitter leads of the transistor, functioning as a Class A amplifier, increases. With the transistor in electrical series with the battery 52 and the load 12 any increase in voltage drop thereacross adversely reduces the voltage applied to the load between the output terminals 14 and 16. Therefore, as the current in the base lead 66 decreases the voltage drop across the transistor increases which reduces the current through the relay coil 46 and eventually open the switch 72. The opening of the switch 72 opens the power supply circuit to inhibit further current drain of the battery 52 through the load 12.

The switch 72, in the preferred embodiment, is a magnetic reed switch sealed in a glass enclosure. The switch is operatively responsive to the magnetic field generated by the relay coil 46. By mechanically placing the switch within the influence of the magnetic field generated by the coil 46, the sensitivity of the switch may be regulated. Since the force of the magnetic field is a function of current applied to the coil, the predetermined value of the power supply under-voltage is set by the physical placement of the switch in the magnetic field. It is obvious to one skilled in the art, that the switch 72 may be a standard relay switch.

Referring to FIG. 2 there is illustrated a power supply circuit similar to that illustrated in FIG. 1 with the addition of control circuits for regulating the full voltage range of the power supply. In FIG. 2, the circuit elements which are identical of those of FIG. 1 have the same reference numeral. This circuit, in addition to providing the features of the circuit of FIG. 1, additionally includes the switch means 76 for manually controlling the energization and de-energization of the power supply 10. This switch is positioned in a low current circuit and functions to open and close the circuit for the coil 46 and thereby control the high current power supply circuit through a low current path.

The circuit of FIG. 2 additionally includes a first voltage sensing means 78 comprising a resistor 80 and a voltage regulator 82 which are electrically connected in shunt with battery 52 and the blocking diode 58. The first voltage sensing means 78 is responsive to the voltage of the battery 52 generating a first voltage at a terminal 84 representing the normal voltage output of the battery. A second voltage sensing circuit 86 comprising a voltage divider comprising the two resistors 88 and 90 is electrically connected across the output terminals 14 and 16 of the power supply and is responsive to the voltage supplied to the load 12. At the terminal 92, a second voltage is generated which is proportional to the voltage supplied to the load. The voltages generated at the terminals 84 and 92 are electrically compared in the voltage comparison means or differential amplifier 94 wherein a control current is generated in response to said comparison. The switch 72 electrically connects the output of the differential amplifier 94 to the base of the transistor 62.

The first voltage sensing means 78 which was hereinabove described, contains a resistor 80 and a voltage regulator 82 for generating a fixed reference voltage. In the preferred embodiment, the voltage regulator 82 is a zener diode and its zener voltage rating is less than the minimum voltage desired at the output of the power supply. The anode lead of the zener diode is electrically connected to the emitter 64 of the impedance means 62 and to the negative plate 60 of the battery 52.

Additionally, the first voltage sensing means 78 provides a low current discharge path to discharge the battery 52. This path comprises the positive battery plate 56, the blocking diode 58, the resistor 78 and the zener diode 82. In the preferred embodiment, the battery 52 comprises a plurality of nickel cadmium rechargeable voltage cells which display, as do all such cells, a characteristic known as memory-effect. Memory-effect, in nickel cadmium voltage cells, is defined as a coulombic loss which is reflected in the voltage output of the cell. This condition, memory-effect, is apparent when a nickel cadmium cell is repeatively cycled through a substantially constant regulated current discharge-charge cycle. The memory-effect causes the cell output voltage to drop to a lower voltage level during discharge than would normally be expected and desired. To avoid this effect, the voltage cell is occasionally cycled to a "deep" voltage discharge value and then recharged to its full voltage value. The first sensing means in FIG. 2 as well as the resistor 63 in FIG. 1, provides a low current discharge path for a substantial or deep voltage discharge over a period of non-use to erase the memory-effect of the battery.

The time to accomplish the erasing of the memory-effect is controlled by the value of the resistance in the circuit and in particular the value of the resistors 63 and 80. The value of the resistors must not be too small so that the battery discharges to any extent during normal periods of non-use and in the preferred embodiment the current in the discharge path is substantially less than one hundredth (0.01) of the value of the load current. This accomplishes a deep discharge to a voltage level of approximately 50 percent in 60 hours.

The second sensing means 86, in the preferred embodiment, comprises a voltage divider circuit having the two resistors 88 and 90. The voltage generated at terminal 92 is compared in the differential amplifier 94 with the zener voltage generated at the terminal 84 and as a result, the differential amplifier 94 generates the control current proportional thereto. As in FIG. 1, the impedance means 62 functions as a class A amplifier in response to the control current applied to its base 66. Therefore, if the voltage at terminal 92 is increased beyond its normal voltage indicating a high voltage condition the transistor will conduct less and less thereby raising or increasing the impedance between the emitter 64 and the collector 65, and in a similar manner if the voltage at terminal 92 falls below its normal voltage the control current from the differential amplifier will be increased attempting to drive the transistor 62 into saturation.

For over voltage protection, the voltage at the terminal point 92 is increased beyond its normal voltage value to a value where the differential amplifier does not supply enough control current for maintaining the transistor 62 in conduction. When this occurs, the power supply return path to the battery and the secondary winding 24 is substantially opened by increasing the impedance between the emitter 64 and the collector 65 thereby effectively removing the voltage from the load. If this is a momentary condition and the alternating current is still applied to the primary winding 22 the relay coil 46 will not de-energize and the switch 72 will not open. As the voltage across terminals 14–16 begins to decrease the voltage at terminal 92 also decreases and the differential amplifier 94 begins to generate a control current to turn on the transistor 62. Thus, if the supply fluctuates about its upper voltage level, the voltage sensing circuits will respond thereto to prevent the supply across the terminals 14 and 16 from increasing beyond a predetermined voltage level.

Under-voltage protection of the power supply of FIG. 2, is provided in a manner similar as that described in FIG. 1, namely, when the source of alternating current potential is removed from the primary winding 22 the relay coil is held energized under control of the battery power. However, until that point, the removal of alternating potential, is reached, under-voltage regulation of the supply of FIG. 2 is accomplished by the cooperation between the first and second voltage sensing circuits. As the voltage at the terminal 92 begins to decrease below its normal voltage, the differential amplifier 94 in response thereto increases the amount of current applied to the base 66 of the transistor 62. This effectively drives the transistor into saturation thereby reducing the voltage drop across the transistor 62 and effectively increasing the voltage drop between the output terminals 14 and 16.

There has thus been shown and described an over voltage, under-voltage regulating circuit in combination with a under voltage control circuit for a battery regulated power supply. It has been shown that when the power supply is basically put on auxiliary power, namely, that of the battery supplying the load power due to the accidental removal of the source of alternating, the battery is protected from being rapidly discharged to such a point as will either damage the battery or possibly adversely affect the electrical load connected to the power supply. In the preferred embodiment, by the proper position of the magnetic reed switch with respect to its actuating coil, the under voltage control point of the power supply may be selectively and individually adjusted for each individual power supply.

What is claimed is:

1. In a battery regulated power supply a control system for maintaining the output supply voltage to an electrical load within a predetermined range, said control system comprising:
   a transformer having a primary winding electrically connected to a source of alternating current and at least one secondary winding;
   rectifying means electrically connected in shunt with said secondary winding for supplying direct current voltage to the electrical load;

a battery electrically connected in shunt with said rectifying means for regulating the output of said rectifying means when said transformer is energized by the source of alternating current and for supplying power to the load in the absence of the source of alternating current;

first voltage sensing means electrically connected in shunt with said battery for generating a first voltage proportional to the voltage regulated by said battery;

second voltage sensing means electrically connected in parallel circuit with the electrical load and responsive to the voltage applied thereto from said rectifying means for generating a second voltage in response thereto;

differential voltage amplifier means electrically responsive to said first and second voltage for generating a control current in response to the value of said second voltage compared to said first voltage; and impedance means electrically connected in series circuit with the electrical load and said second voltage sensing means and responsive to said control current varying its impedance for maintaining the voltage applied to the electrical load and said second voltage sensing means within a predetermined voltage range.

2. The control system according to claim 1 wherein said impedance means is a grounded collector transistor having its emitter electrically connected to one side of said battery and said rectifying means and responsive to said control current for varying the degree of conduction of said transistor and thereby the voltage applied to the electrical load and the second voltage sensing means.

3. The control system according to claim 2 further including:

a second secondary winding on said transformer;

second rectifying means electrically connected in shunt with said second secondary winding;

a relay coil electrically connected in a first circuit to said second rectifying means and responsive thereto, said coil electrically connected in a second circuit in electrical parallel with said second voltage sensing means for maintaining said coil energized above a predetermined voltage level; and a switch responsive to the energization of said relay coil for electrically connecting the control current from said differential amplifier means to the base of said transistor for varying the impedance thereof.

4. The control system according to claim 1 further including means for providing a very low current battery discharge path for erasing the memory-effect of the battery, said means electrically connected in shunt circuit with said battery and said first voltage sensing means for discharging the battery over a substantially long period of time.

* * * * *